(12) United States Patent
Toft et al.

(10) Patent No.: US 11,446,907 B2
(45) Date of Patent: Sep. 20, 2022

(54) NON-FOIL PACKAGING LAMINATE, METHOD FOR MANUFACTURING OF THE PACKAGING LAMINATE AND PACKAGING CONTAINER PRODUCED THEREOF

(75) Inventors: Nils Toft, Lund (SE); Magnus Wijk, Lund (SE); Magnus Råbe, Åkarp (SE); Eva Ehrenberg, Löddeköpinge (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 1604 days.

(21) Appl. No.: 13/382,490

(22) PCT Filed: Jul. 6, 2010

(86) PCT No.: PCT/EP2010/004066
§ 371 (c)(1),
(2), (4) Date: Jan. 5, 2012

(87) PCT Pub. No.: WO2011/003565
PCT Pub. Date: Jan. 13, 2011

(65) Prior Publication Data
US 2012/0117921 A1    May 17, 2012

(30) Foreign Application Priority Data
Jul. 8, 2009  (SE) .................................... 0900950-7

(51) Int. Cl.
*B32B 27/10*   (2006.01)
*B29C 65/36*   (2006.01)
(Continued)

(52) U.S. Cl.
CPC ............ *B32B 27/10* (2013.01); *B29C 65/368* (2013.01); *B29C 65/3656* (2013.01);
(Continued)

(58) Field of Classification Search
None
See application file for complete search history.

(56) References Cited

U.S. PATENT DOCUMENTS 3,480,464 A * 11/1969 Lacy ...................... B32B 27/00
427/250
4,363,851 A    12/1982 Mishina et al.
(Continued)

FOREIGN PATENT DOCUMENTS

CN    1076662 C    12/2001
CN    1676438 A    10/2005
(Continued)

OTHER PUBLICATIONS

"Contiguous", Oxford English Dictionary, 1989, Oxford University Press, 2nd ed, retrieved from http://www.oed.com/oed2/00048564.*
(Continued)

*Primary Examiner* — Ramsey Zacharia
(74) *Attorney, Agent, or Firm* — Buchanan Ingersoll & Rooney PC

(57) ABSTRACT

A non-foil packaging laminate for liquid food packaging comprises a layer of paper or other cellulose-based material, outermost liquid tight, heat sealable layers of polyolefin-based polymers and, vapour-deposition coated onto the inner side of the layer of paper or cellulose-based material, an induction heat susceptible metal coating. Also disclosed is a method for manufacturing of the packaging laminate, a packaging container that is made from the packaging laminate and a method of induction heat sealing the packaging laminate into packaging containers.

24 Claims, 9 Drawing Sheets

Figure 1A:
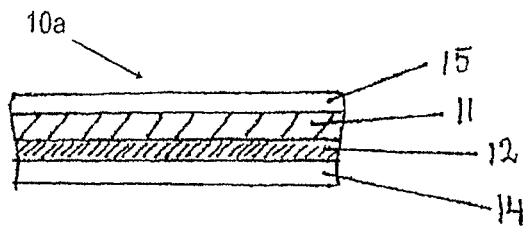

(51) Int. Cl.
  *B29C 65/00* (2006.01)
  *B32B 27/32* (2006.01)
  *B65B 9/20* (2012.01)
  *B65B 51/22* (2006.01)
  *B32B 37/12* (2006.01)
  *B32B 37/15* (2006.01)
  *B32B 37/24* (2006.01)
  *B65D 85/72* (2006.01)
  *B29K 77/00* (2006.01)
  *B29K 711/12* (2006.01)
  *B29L 31/00* (2006.01)
  *B29K 29/00* (2006.01)
  *B29K 305/00* (2006.01)
  *B29K 27/00* (2006.01)
  *B29K 23/00* (2006.01)

(52) U.S. Cl.
  CPC .... *B29C 66/1122* (2013.01); *B29C 66/72321* (2013.01); *B29C 66/72328* (2013.01); *B29C 66/72341* (2013.01); *B29C 66/72343* (2013.01); *B29C 66/83413* (2013.01); *B29C 66/849* (2013.01); *B32B 27/32* (2013.01); *B65B 9/20* (2013.01); *B65B 51/227* (2013.01); *B29C 66/4312* (2013.01); *B29C 66/4322* (2013.01); *B29C 66/71* (2013.01); *B29C 66/83415* (2013.01); *B29K 2003/00* (2013.01); *B29K 2023/086* (2013.01); *B29K 2027/08* (2013.01); *B29K 2029/04* (2013.01); *B29K 2077/00* (2013.01); *B29K 2305/00* (2013.01); *B29K 2711/12* (2013.01); *B29L 2031/7162* (2013.01); *B29L 2031/7166* (2013.01); *B32B 37/12* (2013.01); *B32B 37/153* (2013.01); *B32B 2037/243* (2013.01); *B32B 2037/246* (2013.01); *B32B 2255/12* (2013.01); *B32B 2255/205* (2013.01); *B32B 2255/26* (2013.01); *B32B 2255/28* (2013.01); *B32B 2264/10* (2013.01); *B32B 2307/31* (2013.01); *B32B 2307/718* (2013.01); *B32B 2307/724* (2013.01); *B32B 2307/7244* (2013.01); *B32B 2307/7265* (2013.01); *B32B 2311/24* (2013.01); *B32B 2317/12* (2013.01); *B32B 2439/70* (2013.01); *Y10T 428/27* (2015.01); *Y10T 428/277* (2015.01); *Y10T 428/2804* (2015.01)

(56) References Cited

U.S. PATENT DOCUMENTS

| | | | |
|---|---|---|---|
| 4,599,275 A | | 7/1986 | Hayashi et al. |
| 5,006,405 A | * | 4/1991 | Watkins ............... B65D 31/02 |
| | | | 219/113 |
| 7,033,455 B1 | * | 4/2006 | Berlin ................. B32B 27/10 |
| | | | 156/244.11 |
| 2005/0221104 A1 | | 10/2005 | Ortolani et al. |
| 2006/0105124 A1 | | 5/2006 | Kikuchi |
| 2006/0198975 A1 | | 9/2006 | Kikuchi |
| 2009/0098395 A1 | * | 4/2009 | Lu .............................. 428/454 |
| 2009/0110888 A1 | * | 4/2009 | Wuest et al. .............. 428/200 |
| 2010/0040888 A1 | * | 2/2010 | Fields ..................... C08J 7/045 |
| | | | 428/418 |

FOREIGN PATENT DOCUMENTS

| | | | | |
|---|---|---|---|---|
| CN | 1756653 A | | 4/2006 | |
| DE | 4445193 A1 | * | 7/1995 | ........... C08F 210/02 |
| EP | 0931646 A2 | | 7/1999 | |
| EP | 1 584 464 A1 | | 10/2005 | |
| EP | 1 598 176 A1 | | 11/2005 | |
| EP | 1612039 A1 | | 1/2006 | |
| GB | 2053283 A | | 2/1981 | |
| JP | 565759 A | | 1/1981 | |
| JP | 58-136845 A | | 8/1983 | |
| JP | 11-314299 A | | 11/1999 | |
| JP | 2000-168770 A | | 6/2000 | |
| JP | 2002-120320 A | | 4/2002 | |
| JP | 2002-120340 A | | 4/2002 | |
| JP | 2002200708 A | | 7/2002 | |
| JP | 2002-326321 A | | 11/2002 | |
| JP | 2004-98648 A | | 4/2004 | |
| JP | 2004-262048 A | | 9/2004 | |
| JP | 2004306411 A | | 11/2004 | |
| JP | 2006-256198 A | | 9/2006 | |
| MX | 2010010143 A | | 10/2010 | |
| WO | 2009/112255 A1 | | 9/2009 | |

OTHER PUBLICATIONS

English translation of Chinese Office Action dated Jan. 6, 2014 issued in the corresponding Chinese Patent Application No. 201080030896.8 (10 pages).

International Search Report (PCT/ISA/210) dated Feb. 23, 2011, by European Patent Office as the International Searching Authority for International Application No. PCT/EP2010/004066.

Office Action issued by the Japanese Patent Office dated Nov. 24, 2015 in Japanese Patent Application No. 2012-518803, and English translation of Office Action (4 pages).

* cited by examiner

NON-FOIL PACKAGING LAMINATE, METHOD FOR MANUFACTURING OF THE PACKAGING LAMINATE AND PACKAGING CONTAINER PRODUCED THEREOF

TECHNICAL FIELD

The present invention relates to a non-foil packaging laminate for induction heat sealing into packages for liquid food or beverage. The invention also relates to a method for manufacturing of the packaging laminate and to a packaging container made from the packaging laminate, thus employing a method of induction heat sealing the non-foil packaging laminate.

BACKGROUND OF THE INVENTION

Packaging containers of the single use disposable type for liquid foods are often produced from a packaging laminate based on paperboard or carton. One such commonly occurring packaging container is marketed under the trademark Tetra Brik Aseptic® and is principally employed for aseptic packaging of liquid foods such as milk, fruit juices etc, sold for long term ambient storage. The packaging material in this known packaging container is typically a laminate comprising a bulk core layer of paper or paperboard and outer, liquid-tight layers of thermoplastics. In order to render the packaging container gas-tight, in particular oxygen gas-tight, for example for the purpose of aseptic packaging and packaging of milk or fruit juice, the laminate in these packaging containers normally comprises at least one additional layer, most commonly an aluminium foil.

On the inside of the laminate, i.e. the side intended to face the filled food contents of a container produced from the laminate, there is an innermost layer, applied onto the aluminium foil, which innermost, inside layer may be composed of one or several part layers, comprising heat sealable adhesive polymers and/or polyolefins. Also on the outside of the core layer, there is an outermost heat sealable polymer layer.

The aluminium foil moreover renders the packaging material thermosealable by inductive thermosealing which is a rapid and efficient sealing technique for obtaining mechanically strong, liquid- and gas-tight sealing joints or seams during the production of the containers.

The packaging containers are generally produced by means of modern, high-speed packaging machines of the type that form, fill and seal packages from a web or from prefabricated blanks of packaging material. Packaging containers may thus be produced by reforming a web of the laminated packaging material into a tube by both of the longitudinal edges of the web being united to each other in an overlap joint by welding together the inner- and outermost heat sealable thermoplastic polymer layers. The tube is filled with the intended liquid food product and is thereafter divided into individual packages by repeated transversal seals of the tube at a predetermined distance from each other below the level of the contents in the tube. The packages are separated from the tube by incisions along the transversal seals and are given the desired geometric configuration, normally parallelepipedic, by fold formation along prepared crease lines in the packaging material.

The main advantage of this continuous tube-forming, filling and sealing packaging method concept is that the web may be sterilised continuously just before tube-forming, thus providing for the possibility of an aseptic packaging method, i.e. a method wherein the liquid content to be filled as well as the packaging material itself are reduced from bacteria and the filled packaging container is produced under clean circumstances such that the filled package may be stored for a long time even at ambient temperature, without the risk of growth of micro-organisms in the filled product. Another important advantage of the continuous Tetra Brik®-type packaging method is, as stated above, the possibility of continuous high-speed packaging, which has considerable impact on cost efficiency.

A layer of an aluminium foil in the packaging laminate provides excellent gas barrier properties compared to most polymeric gas barrier materials. The conventional aluminium-foil based packaging laminate for liquid food aseptic packaging is the most cost-efficient packaging material, at its level of performance, available on the market today. Any other material to compete must be more cost-efficient regarding raw materials, have comparable food preserving properties and have a comparably low complexity in the converting into a finished packaging laminate.

There is now a trend growing towards developing such packaging materials having no aluminium-foil in the laminated structure, seeking to improve the environmental profile of the resulting material. It is then of course desirable to lower the costs for manufacturing of the packaging material and keeping the necessary properties for aseptic long-term storage of the package containers produced from the packaging laminate.

At the same time, it would be ideal if the packaging laminate were directly suitable for use in the already installed base of filling and packaging machines presently running at the dairies and filling sites all over the world. The absence of aluminium foil from a packaging laminate has, however, presented a technical problem to be solved regarding the heat sealing of the outermost thermoplastic layers, since there is no longer a material in the laminate that is susceptible to induce a current to generate heat, emanating from a magnetic field in the way that has been done with aluminium foil. Instead, alternative technologies have been discussed and developed such as heat generation by means of ultrasonic vibrations or old conventional convection and hot-air sealing methods. The implementation of such alternative sealing technologies leads to it being necessary to entirely re-build the sealing part of the packaging machines already installed at dairies and filling sites.

It has evolved that packaging laminates involving two or more barrier layers, of which one is a metallised layer, may present feasible alternatives to foil-based laminates, however, with the abovementioned complication that the present induction heat sealing equipment cannot be used.

However, it has now been seen that contrary to all previous belief, it would be possible to actually generate sufficient heat for heat melting an adjacent thermoplastic layer by means of a metallised layer, by means of induction sealing technology, provided that certain less revolutionary adaptations were made on the existing machines. The metallised layers first tested were primarily coated on oriented PET film substrates.

In connection with continued work on adapting the induction sealing technology for metallised layers, it has, however, been noticed that different substrates vary in suitability for metallisation and subsequent induction heat sealing. In order to work well, it seems the metallised layer should have a certain combination of thickness, or optical density, with layer quality. By quality is primarily meant that the layer should be homogeneous and have substantially the same thickness all across the width and length of the laminated packaging material.

PET-film substrates are generally quite expensive for what they provide in a packaging laminate of the above described kind. Actually, the about only significant contribution it has to the packaging laminate is that of acting as a carrier for the metallised layer. While it is believed that the induction sealing technology is feasible and possible to adapt also to other, less expensive, polymer substrates, it has been seen that the sealing process will probably need more calibration and surveillance in order to operate efficiently and reliably. It has also been seen that the choice of substrate may influence the quality and durability of the metallised layer during the heat sealing process.

Accordingly, there is still a need for a cost-efficient and robust, i.e. reliable also at moderate variations in manufacturing and handling conditions, non-aluminium foil packaging material for aseptic, liquid food packaging, e.g. of milk or other beverage, which material provides sufficient barrier properties in packaging containers for long-term aseptic storage, under ambient conditions, and which non-foil packaging material is sealable by means of induction sealing in the installed base of filling and sealing equipment.

DISCLOSURE OF THE INVENTION

It is, therefore, an object of the present invention to overcome or alleviate the above-described problems in producing a non-foil induction heat sealable paper or paperboard packaging laminate.

It is a another object of the invention to provide a non-foil, paper or paperboard packaging laminate, suitable for long-term, aseptic packaging of liquid or wet food, which can be heat sealed into packaging containers with good tightness to liquid and gas, by means of induction heat sealing.

It is a further object of the invention to provide a cost-efficient non-foil, paper or paperboard packaging laminate, suitable for long-term, aseptic packaging of liquid or wet food, which can be heat sealed into packaging containers with good tightness to liquid and gas, by means of induction heat sealing, which packaging containers have good barrier properties not only against gas and water vapour, but also towards light and odour substances.

These objects are thus attained according to the present invention by the laminated packaging material, the packaging container and the method of manufacturing the packaging material, as defined in the appended claims.

According to a first aspect of the invention, the general objects are attained by a non-foil packaging laminate for induction heat sealing into packages for liquid food or beverage, the packaging laminate comprising at least one, first, layer of paper or other cellulose-based material, which first paper layer is situated at the inner side of the packaging laminate and is pre-coated to receive and support a metal vapour deposited layer, being adapted to induce heat sealing in an adjacent thermoplastic polymer layer, the packaging laminate further comprising such a metal vapour deposited layer applied or vapour deposited directly onto and adjacent the inner side of said pre-coated first layer of paper or cellulose-based material, and further comprising one or more layer(s) of liquid tight, heat sealable thermoplastic polymer material applied onto the inner side of the metal vapour deposition coating. Normally, and most conveniently, an outermost layer of liquid tight, heat sealable thermoplastic polymer material is applied also on the opposite side of the packaging laminate.

According to a well-functioning embodiment of the invention, in order to provide a smooth receiving surface for the metal vapour deposition coating and to prepare the paper to support said metal coating in a good way during a subsequent heat sealing operation, the first layer of paper or other cellulose-based material is coated onto its inner side with an induction sealing durable coating layer having a higher melting point than the innermost layer of heat sealable material. Subsequently, onto the inner side of the induction heat sealing durable coating layer is further applied said layer of an induction heat susceptible metal vapour deposition coating, which is adapted to induce heat sealing in an adjacent thermoplastic polymer layer.

The most cost-efficient way of providing such a coating onto the paper layer, in order to prepare it for metal vapour deposition coating, is to apply it by means of a liquid film coating method, often also generally referred to as dispersion coating, of a liquid composition onto the paper layer and subsequently drying it, the liquid composition containing an induction sealing durable polymer binder dispersed or dissolved in an aqueous or solvent medium.

According to some good-working examples, the induction sealing durable coating layer is formed from a composition mainly comprising a polymer selected from the group consisting of polyvinyl alcohol (PVOH), water dispersible ethylene vinyl alcohol (EVOH), polyvinylidenechloride (PVDC), water dispersible polyamide (PA), water dispersible polyester, polysaccharide, polysaccharide derivatives, including starch and starch derivatives, and combinations of two or more thereof. Importantly, the thus coated layer has a higher melting point than the innermost layer of thermoplastic material, by which it is intended to heat seal the packaging laminate into filled and sealed packages. Preferably, the thermoplastic heat sealable material is based on polyolefins, more preferably based on polyethylene and most preferably based on low density polyethylene, such as for example LDPE, LLDPE, or m-LLDPE.

Where it is desirable to use a polymer that has a more cost-efficient and positive environmental profile, the induction sealing durable coating layer is formed from a composition mainly comprising PVOH, water dispersible EVOH or starch. A water dispersible EVOH has a higher amount of vinyl alcohol units compared to melt processable EVOH, and are more similar in nature to PVOH than to EVOH. Pure PVOH and starch-based polymers may be more or less biologically degradable, why such polymers may be more desirable for some packaging applications.

In addition, some polymer binders suitable for liquid film coating, also have gas barrier properties, which make them even more desirable in a packaging laminate. Accordingly, the induction sealing durable coating layer may be preferred to be formed from a composition mainly comprising a polymer selected from the group consisting of (PVOH), water dispersible (EVOH), (PVDC), water dispersible polyamide (PA), starch, starch derivatives, and combinations of two or more thereof.

In comparison with aluminium foil, PVOH as a liquid film coating barrier polymer enjoys many desirable properties, with the result that it is the most preferred barrier material in many contexts. Among these, mention might be made of the good film formation properties, compatibility with foods and economic value, together with its high oxygen gas barrier properties. In particular, PVOH provides a packaging laminate with high odour barrier properties, which is especially important for the packaging of milk.

Like many other conceivable such high-temperature melting polymers such as, for example, starch or starch derivatives, polyvinyl alcohol is suitably applied by means of a liquid film coating process, i.e. in the form of an aqueous or solvent-based dispersion or solution which, on application, is spread out to a thin, uniform layer on the substrate and thereafter dried.

Aqueous systems generally have certain environmental advantages. Preferably, the liquid gas barrier composition is water-based, because such composition usually have a better work environment friendliness than solvent-based systems, as well.

In order to improve the water vapour and oxygen barrier properties of a PVOH coating, a polymer or compound with functional carboxylic acid groups may be included in the composition. Suitably, the polymer with functional carboxylic acid groups is selected from among ethylene acrylic acid copolymer (EAA) and ethylene methacrylic acid copolymers (EMAA) or mixtures thereof. One known such particularly preferred barrier layer mixture consists of PVOH, EAA and an inorganic laminar compound. The EAA copolymer is then included in the barrier layer in an amount of about 1-20 weight %, based on dry coating weight.

It is believed that the improved oxygen and water barrier properties result from an esterification reaction between the PVOH and the EAA at an increased drying temperature, whereby the PVOH is crosslinked by hydrophobic EAA polymer chains, which thereby are built into the structure of the PVOH. Such a mixture is, however, more expensive because of the cost of the additives. Furthermore, the compositions may be made more durable by drying and curing at elevated temperatures. Crosslinking can also be induced by the presence of polyvalent compounds, e.g. metal compounds such as metal-oxides, although such compounds are less preferred in the coating compositions for this purpose.

Special kinds of water-dispersible ethylene vinyl alcohol polymer (EVOH) have lately been developed and may be conceivable for an oxygen barrier liquid coating composition. Conventional EVOH polymers, however, are normally intended for extrusion and are not possible to disperse/dissolve in an aqueous medium in order to produce a thin liquid film coated barrier film of 5 g/m2 or below, preferably 3.5 g/m2 or below. It is believed that the EVOH should comprise a rather high amount of vinyl alcohol monomer units to be water-dispersible or dissolvable and that the properties should be as close to those of liquid film coating grades of PVOH as possible. An extruded EVOH layer is not an alternative to liquid film coated EVOH, because it inherently has less similar properties to PVOH than EVOH grades for extrusion coating, and because it cannot be applied at a cost-efficient amount below 5 g/m2 as a single layer by extrusion coating or extrusion lamination, i.e. it requires co-extruded tie layers, which are generally very expensive polymers. Furthermore, very thin extruded layers cool off too quickly and do not contain enough heat energy to sustain sufficient lamination bonding to the adjacent layers.

Other examples of polymer binders, suitable for liquid film coating, are the polysaccharides, in particular starch or starch derivatives, such as preferably oxidised starch, cationic starch and hydroxpropylated starch. Examples of such modified starches are hypochlorite oxidised potato starch (Raisamyl 306 from Raisio), hydroxypropylated corn starch (Cerestar 05773). However, also other starch forms and derivatives may be feasible liquid film coating binders.

Further examples of polymer binders are coatings comprising mixtures of carboxylic acid containing polymers, such as acrylic acid or methacrylic acid polymers, and polyalcoholic polymers, such as PVOH or starch. A cross-linking reaction of these polymer binders are preferred, as mentioned above, for resistance to high humidity.

Most preferably, however, the binder polymer is PVOH, because it has all the good properties mentioned above, i.e. in addition to good induction heat sealing resistance, also good film formation properties, gas barrier properties, cost efficiency, food compatibility and odour barrier properties.

A PVOH-based gas barrier composition performs best when the PVOH has a degree of saponification of at least 98%, preferably at least 99%, although also PVOH with lower degrees of saponification will provide good properties.

According to one embodiment, the liquid composition additionally comprises inorganic particles in order to further improve the oxygen gas barrier properties.

The polymer binder material may for example be mixed with an inorganic compound which is laminar in shape, or flake-formed. By the layered arrangement of the flake-shaped inorganic particles, an oxygen gas molecule has to migrate a longer way, via a tortuous path, through the oxygen barrier layer, than the normal straight path across a barrier layer.

According to one embodiment, the inorganic laminar compound is a so-called nanoparticle compound dispersed to an exfoliated state, i.e. the lamellae of the layered inorganic compound are separated from each other by means of a liquid medium. Thus the layered compound preferably may be swollen or cloven by the polymer dispersion or solution, which at dispersion has penetrated the layered structure of the inorganic material. It may also be swollen by a solvent before added to the polymer solution or polymer dispersion. Thus, the inorganic laminar compound is dispersed to a delaminated state in the liquid gas barrier composition and in the dried barrier layer. The term clay minerals includes minerals of the kaolinite, antigorite, smectite, vermiculite, bentonite or mica type, respectively. Specifically, laponite, kaolinite, dickite, nacrite, halloysite, antigorite, chrysotile, pyrophyllite, montmorillonite, hectorite, saponite, sauconite, sodium tetrasilicic mica, sodium taeniolite, commonmica, margarite, vermiculite, phiogopite, xanthophyllite and the like may be mentioned as suitable clay minerals. Preferred nano-particles are those of montmorillonite, most preferred purified montmorillonite or sodium-exchanged montmorillonite (Na-MMT). The nano-sized inorganic laminar compound or clay mineral preferably has an aspect ratio of 50-5000 and a particle size of up to about 5 µm in the exfoliated state.

Preferably, the inorganic particles mainly consist of such laminar bentonite particles having an aspect ratio of from 50 to 5000.

Suitably, the barrier layer includes from about 1 to about 40 weight %, more preferably from about 1 to about 30 weight % and most preferably from about 5 to about 20 weight %, of the inorganic laminar compound based on dry coating weight. If the amount is too low, the gas barrier properties of the coated and dried barrier layer will not be markedly improved compared to when no inorganic laminar compound is used. If the amount is too high, the liquid composition will become more difficult to apply as a coating and more difficult to handle in storage tanks and conduits of the applicator system. Preferably, the barrier layer includes from about 99 to about 60 weight %, more preferably from about 99 to about 70 weight % and most preferably from about 95 to about 80 weight % of the polymer based on the dry coating weight. An additive, such as a dispersion stabiliser or the like, may be included in the gas barrier composition, preferably in an amount of not more than about 1 weight % based on the dry coating.

According to a another embodiment, the inorganic particles mainly consist of laminar talcum particles having an aspect ratio of from 10 to 500. The composition normally comprises an amount of from 10 to 50 weight-%, more preferably from 20 to 40 weight-% of the talcum particles, based on dry weight. Below 20 weight-%, there is no significant increase in gas barrier properties, while above 50 weight-%, the coated layer may be more brittle and breakable because there is less internal cohesion between the particles in the layer. Above 50 weight %, the polymer binder seems to be in too low amount to surround and disperse the particles and laminate them to each other within the layer.

Alternatively, surprisingly good oxygen barrier properties may be achieved when there is made use of colloidal silica particles, exhibiting a particle size of 3-150 nm, preferably 4-100 nm and even more preferred 5-70 nm, which particles are preferably amorphous and spherical. The use of colloidal silica particles moreover has the advantage that the liquid barrier composition may be applied at a dry content of 15-40 weight %, preferably 20-35 weight % and even more preferred 24-31 weight %, whereby the demand on forcible drying is decreased.

Other alternatives of inorganic particles that may be used are particles of kaolin, mica, calcium carbonate etc.

The preferred polymer binder, also when employing inorganic particles for providing oxygen barrier properties, is PVOH, partly due to its advantageous properties mentioned above. In addition, PVOH is advantageous from a mixing point of view, i.e. it is generally easy to disperse or exfoliate inorganic particles in an aqueous solution of PVOH to form a stable mixture of PVOH and particles, thus enabling a good coated film with a homogeneous composition and morphology.

Preferably, according to the invention, the said induction heat sealing durable layer is applied at a total amount of from 0.5 to 7 $g/m^2$, preferably from 0.5 to 5 $g/m^2$, more preferably 0.5 to 3 $g/m^2$, dry weight. Below 0.5 $g/m^2$, there will be a too low effect of induction sealing durability, and there is a risk of pinholes being formed, depending on paper or substrate characteristics, in connection with the removal of water or solvent for drying the applied barrier layer, if the applied layer is too thin. On the other hand, at above 7 $g/m^2$, the coated layer will not bring cost-efficiency to the packaging laminate, due to high cost of polymers in general and due to high energy cost for evaporating off the dispersion liquid.

Additionally, a recognisable level of oxygen barrier is achieved by PVOH at 0.5 $g/m^2$ and above, and a good balance between barrier properties and costs is achieved between 0.5 and 3.5 $g/m^2$.

According to one embodiment of the invention, the oxygen gas barrier layer is applied in two consecutive steps with intermediate drying, as two part-layers. If thus applied as two part-layers, each layer is suitably applied in amounts from 0.3 to 3.5 $g/m^2$, preferably from 0.5 to 2.5 $g/m^2$, and allows a higher quality total layer from a lower amount of liquid gas barrier composition. More preferably, the two part-layers are applied at an amount of from 0.5 to 2 $g/sm^2$ each, preferably from 0.5 to 1.5 $g/m^2$ each.

The metal vapour deposition coating layer is applied by means of physical vapour deposition (PVD) onto the thin coated paper substrate. The thin metal vapour deposition coatings according to the invention are nanometer-thick, i.e. have a thickness that is most suitably counted in nanometers, for example of from 5 to 500 nm (50 to 5000 Å), preferably from 5 to 200 nm, more preferably from 5 to 100 nm and most preferably from 5 to 50 nm.

Generally, below 5 nm the induction heat sealing durable properties may be too low to be useful and above 200 nm, the coating may be less flexible and, thus, more prone to cracking when applied onto a flexible substrate.

Commonly, such a vapour deposition coating having induction heat durability is made of a metal compound, and preferably an induction heat sealing inducing metal vapour deposition coating layer is a layer substantially consisting of aluminium. Normally, an aluminium metallised layer inherently has a thin surface portion consisting of an aluminium oxide due to the nature of the metallisation coating process used.

Suitably, the metal vapour deposition coating layer has an optical density (OD) of from 1 to 5, preferably of from 1.5 to 3.5, more preferably from 2 to 3.

An aluminium-based thin vapour deposited layer preferably has a thickness of from 5 to 100 nm, more preferably from 5-50 nm, which corresponds to less than 1% of the aluminium metal material present in an aluminium foil of conventional thickness, i.e. 6.3 μm.

In order to improve the adhesion of the coating to the substrate, a step of surface treatment of the substrate film may be carried out before vapour deposition coating, especially metallising, the substrate.

The most preferred metal according to the present invention is aluminium, although any other metal capable of being vacuum deposited into a homogeneous coating, may be used according to the invention. Thus, less preferred and less common metals such as Au, Ag, Cr, Zn, Ti or Cu are conceivable also. Generally, thin coatings of metal or a mixture of metal and metal oxide provide barrier properties against water vapour and are used also when the desired function is to prevent water vapour from migrating into and through the multilayer film or packaging laminate. Most commonly however, the metal in a metallisation coating is aluminium (Al).

In order to render a metal vapour deposition coating process cost-efficient, the substrate, i.e. the first, innermost situated, layer of paper or other cellulose-based material (11) should be as thin as possible, so that as many meters as possible may be rolled onto a roll of coated paper. Preferably, the first paper layer has a surface weight of from 20 to 100 g/m2, preferably from 20 to 70 g/m2, more preferably from 30-60 g/m2. When the paper is too thin, it will naturally be more difficult to handle in subsequent coating and lamination processes. On the other hand, the thinner the paper can be, the more cost-efficient it can be in the metal vapour deposition coating process. Seen from a stiffness perspective, a thicker first paper layer also contributes to a higher stiffness and grip-ability of the total packaging laminate structure.

A second layer of paper or paperboard, for use as a core stabilising layer, in a common carton package for liquid packaging, usually has a thickness of from about 100 μm up to about 600 μm, and a surface weight of approximately 100-500 g/m2, preferably about 200-400 g/m2, more preferably from 200 to 300 g/m2 and may be a conventional paper or paperboard of suitable packaging quality.

On the other hand, for low-cost aseptic, long-term packaging of liquid food, a thinner packaging laminate may be used, having a thinner paper core layer. Packaging containers made from such packaging laminates are not fold-formed and more similar to pillow-shaped flexible pouches. A suitable single paper layer for such pouch-packages then usually has a surface weight of from about 30 to about 140 g/m2, preferably from about 50 to about 120 g/m2, more preferably from 50 to about 110 g/m2, most preferably from 50 to 70 g/m2.

According to one embodiment, such a low cost packaging laminate may alternatively comprise two or more thin paper layers, of which the first, inner paper layer is vapour deposition coated with an induction heat susceptible material, according to the present invention. When there are two papers in the packaging laminate structure, the second outer paper layer suitably has a surface weight of from 20 to 100 g/m2, preferably from 20 to 70 g/m2, more preferably from 20-50 g/m2.

Suitable thermoplastics for the outermost and innermost heat sealable liquid-tight layers are based on polyolefins, such as for example polyethylenes or polypropylenes, preferably polyethylenes and more preferably low density polyethylenes such as, for example LDPE, linear LDPE (LL-DPE) or single site catalyst metallocene polyethylenes (m-LLDPE) or blends of two or more thereof.

Alternative examples of polyolefins suitable for tie layers or adhesive polymer layers, for extrusion lamination layers or even heat sealable layers are modified polyolefins based on LDPE or LLDPE co-polymers or, preferably, graft co-polymers with functional-group containing monomer units, such as carboxylic or glycidyl functional groups, e.g. (meth) acrylic acid monomers or maleic anhydride (MAH) monomers, (i.e. ethylene acrylic acid copolymer (EAA) or ethylene methacrylic acid copolymer (EMAA)), ethylene-glycidyl(meth)acrylate copolymer (EG(M)A) or MAH-grafted polyethylene (MAH-g-PE). Another example of such modified polymers or adhesive polymers are so called ionomers or ionomer polymers. Preferably, the modified polyolefin is an ethylene acrylic acid copolymer (EAA) or an ethylene methacrylic acid copolymer (EMAA).

The vapour deposition coated first paper layer may be bonded to a second paper or paperboard layer by an intermediate polymer layer, preferably a thermoplastic polymer layer and more preferably a layer from a polymer selected from polyolefins and polyolefin-based co-polymers, often known as modified or adhesive polymers, especially LDPE or polyethylene-based polymers or co-polymers, or adhesive polymers, as described in the foregoing paragraph.

In order to further improve the light barrier of a packaging laminate according to the invention, if necessary, particles or pigments providing light barrier properties may be blended into one or more layers of the laminate. One example is light absorbing particles such as carbon black. The black colour of an intermediate layer is then advantageously hidden towards the outside by a paper or paperboard layer, and towards the inner side of the laminate, by a metallised, e.g. aluminium, layer. Another example is light-reflective particles such as titanium dioxide. Such particles may furthermore be adding to a whiter appearance of the packaging laminate.

For thinner low-cost segment packaging laminates, which have a thinner paper core layer, such light reflecting inorganic, white pigments may improve the light barrier properties of the packaging laminate as well as improving the appearance of the packaging material towards the outside.

For higher performance packaging laminates, e.g. requiring longer aseptic shelf life for more sensitive products, it is of course possible to add further barrier layers. One simple way of, for example, increasing further the oxygen barrier properties of the packaging laminate may be to use a thermoplastic bonding layer including a layer of melt-extrudable barrier layer, for the bonding of the metal vapour deposition coated inside first paper layer to a further, second layer of paper or paperboard. According to this embodiment, the only thing to change in order to produce a higher performance packaging laminate, would be to include additional melt extrusion polymer layer(s) in the converting process at the lamination stage (e.g. a further barrier layer and possibly one or two melt co-extrusion tie layers). According to another, more preferred, embodiment, a thin layer of a barrier polymer layer may be co-extrusion coated together with optional tie layer(s) and the innermost heat sealable layer(s) onto the metal-coated inner side of the first paper layer. Such a co-extruded inside barrier layer would have to be kept thin, in order to easily transfer the induced heat through from the metal vapour deposition coating to the heat sealable layer.

Alternatively, a liquid-film oxygen barrier coating layer may be coated onto the other, outer side of the first, innermost paper layer. Alternatively, or additionally, an liquid-film oxygen barrier coating layer may be applied onto the inner side of any further paper layer in the packaging laminate structure.

According to a further aspect of the invention, there is provided a packaging container manufactured from the non-foil packaging laminate of the invention. The packaging container is suitable for long-term, aseptic packaging of liquid or wet food, and has good package integrity with strong, durable seals, from induction heat sealing.

According to yet a further aspect of the invention, there is provided a method for manufacturing of the packaging laminate as defined in independent claim 12.

Thus, the method comprises the steps of providing a first layer of paper or other cellulose-based material, pre-coating the paper or cellulose-based material layer for receiving and supporting an induction heat susceptible metal vapour deposition coating, by first coating an induction sealing durable layer onto the inner side of the paper or cellulose-based material layer, and then applying or vapour depositing an induction heat susceptible metal layer onto the inner side of the thus coated paper layer, providing an innermost layer of a heat sealable thermoplastic polymer material, and laminating the innermost layer to the metal coated paper layer by extrusion coating, or by laminating the innermost layer to the paper layer in the form of a pre-manufactured film.

At any stage of the method, an outermost layer of a heat sealable thermoplastic polymer material may be provided and laminated on the outermost, opposite side, of the packaging laminate. In cases when the packaging laminate structure contains a second paper layer positioned towards the outside of the packaging laminate, the outermost heat sealable polymer layer is then laminated on the outer side of the second paper layer.

An induction heat susceptible metal layer is sufficiently homogeneous and continuous in nature, to be able to transmit an electrical current as a result of an induced magnetic field, and to become heated such that an adjacent thermoplastic polymer layer will be heated and melted to provide melt sealing of said polymer. If the metal layer is discontinuous due to un-even coating or due to cracks, there will be no heating provided in the sealing area.

In the prep-coating of the metal-receiving layer, the method further comprises the steps of providing a liquid composition containing a polymer binder dispersed or dissolved in an aqueous or solvent-based liquid medium and forming a thin induction sealing durable layer, comprising said polymer binder, contiguous to the inner side of the first paper layer, by coating the liquid composition onto the inner side of said layer of paper or other cellulose-based material and subsequently drying to evaporate the liquid, said polymer binder having a melting point higher than the thermoplastic polymer material of the innermost heat sealable layer.

Preferably, the induction sealing durable polymer contained in the liquid composition is selected from a group consisting of polyvinyl alcohol (PVOH), water dispersible ethylene vinyl alcohol (EVOH), polyvinylidenechloride (PVDC), water dispersible polyamide (PA), starch, starch derivatives and combinations of two or more thereof.

According to an embodiment, the induction sealing durable layer (12) is applied in a total amount of from 0.5 to 7 g/m$^2$, preferably from 0.5 to 5 g/m$^2$, more preferably from 0.5 to 3 g/m$^2$, dry weight.

If applied as two part-layers, each layer may suitably be applied in amounts from 0.3 to 3.5 g/m$^2$, preferably from 0.5 to 2.5 g/m$^2$, which allows a higher quality total layer from a lower amount of liquid polymer composition. More preferably, the two part-layers may be applied at an amount of from 0.5 to 2 g/sm$^2$ each, preferably from 0.5 to 1.5 g/m$^2$ each.

In order to reduce the amount of moisture released from the paper layer into the vacuum chamber during the metallisation process, the first paper layer to be metal vapour deposition coated may be coated also on the other, outer side by a liquid film composition of a polymer in aqueous or solvent based dispersion or solution, before the metallisation process step. It is desirable to avoid moisture in the vacuum chamber for metallisation, because it may reduce the speed at which the metallisation process can be carried out.

Furthermore, any back transfer of paper dust in the subsequent handling of coated paper webs on reels may be prevented by such a coating on the back-side.

For food products requiring better barrier properties against oxygen gas, a gas barrier coating layer may be coated onto the outer side of the first paper layer.

In cases when the packaging laminate structure contains a second paper layer positioned towards the outside of the packaging laminate, a gas barrier coating layer may be coated also onto the inside of said second paper layer.

In the case when the packaging laminate structure contains a second paper layer positioned towards the outside of the packaging laminate, the method of the invention further comprises the step of extrusion laminating the vapour deposited thin paper substrate to the inner side of the second paper layer, by means of an intermediate polymer bonding layer, preferably a thermoplastic polymer bonding layer.

A further aspect of the invention is a method of heat sealing a non-foil packaging laminate, comprising the steps of providing a non-foil packaging laminate as defined previously, in the form of a continuous web, forming the web-formed packaging laminate into a continuous tubular shape and applying a longitudinal seal in the longitudinal direction, filling the packaging laminate tube with a liquid foodstuff, forming heat-sealing zones by means of induction heating, at predetermined intervals in the traversing direction of the filled tube, and cutting through the centre of each traversing sealing zone, thereby forming individual containers.

BRIEF DESCRIPTION OF DRAWING FIGURES

Figure 1B:
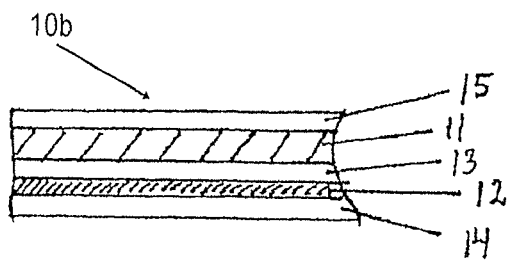
Figure 1C:
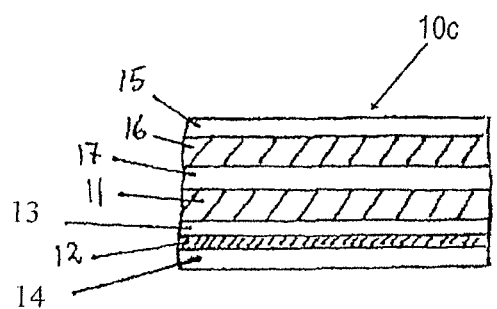
Figure 1D:
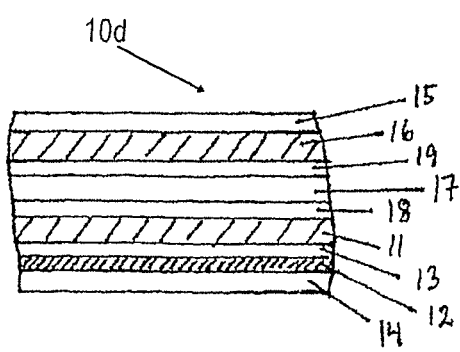
Figure 2:
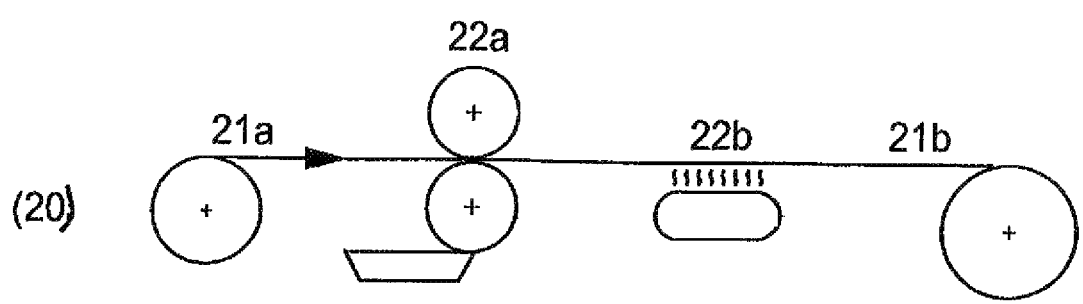
Figure 3:
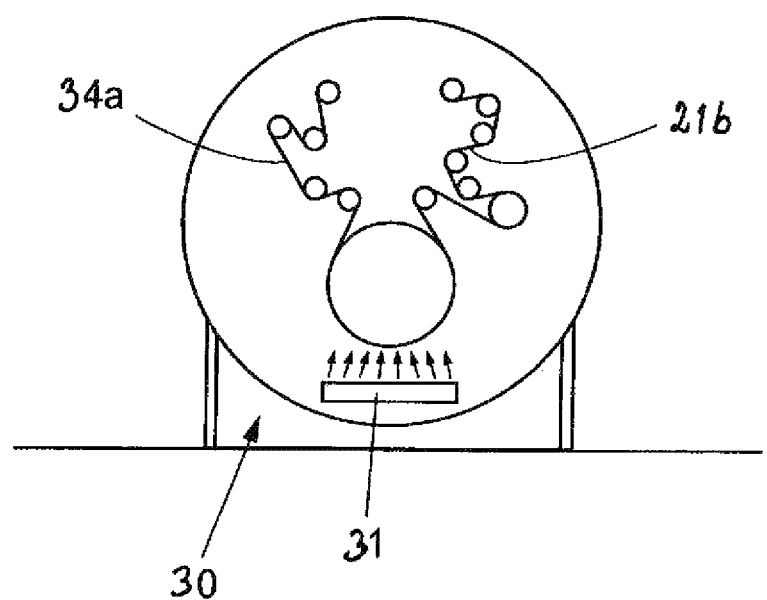
Figure 4A:
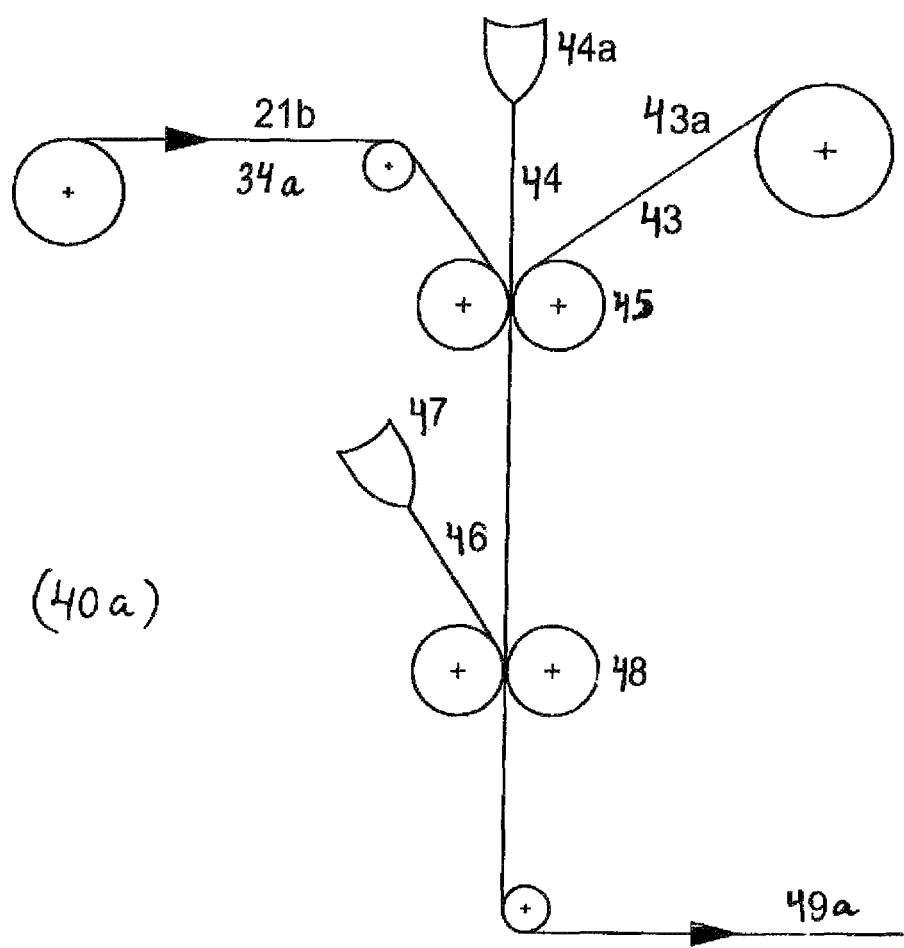
Figure 4B:
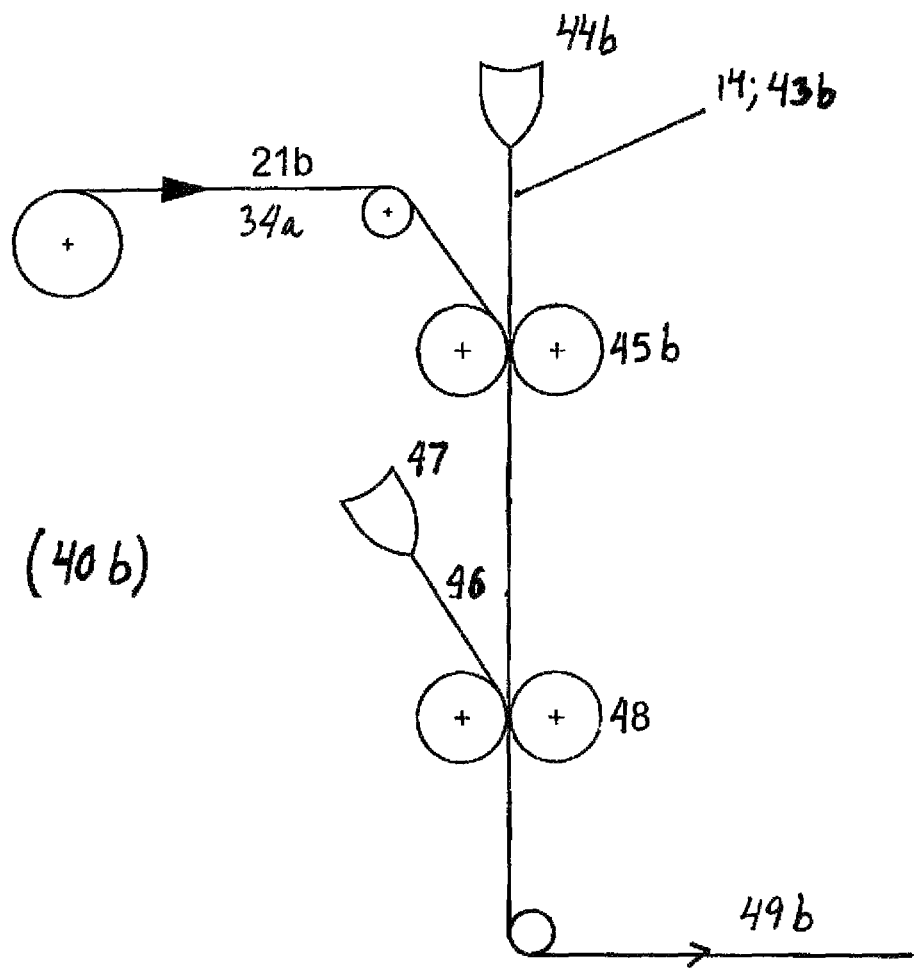
Figure 4C:
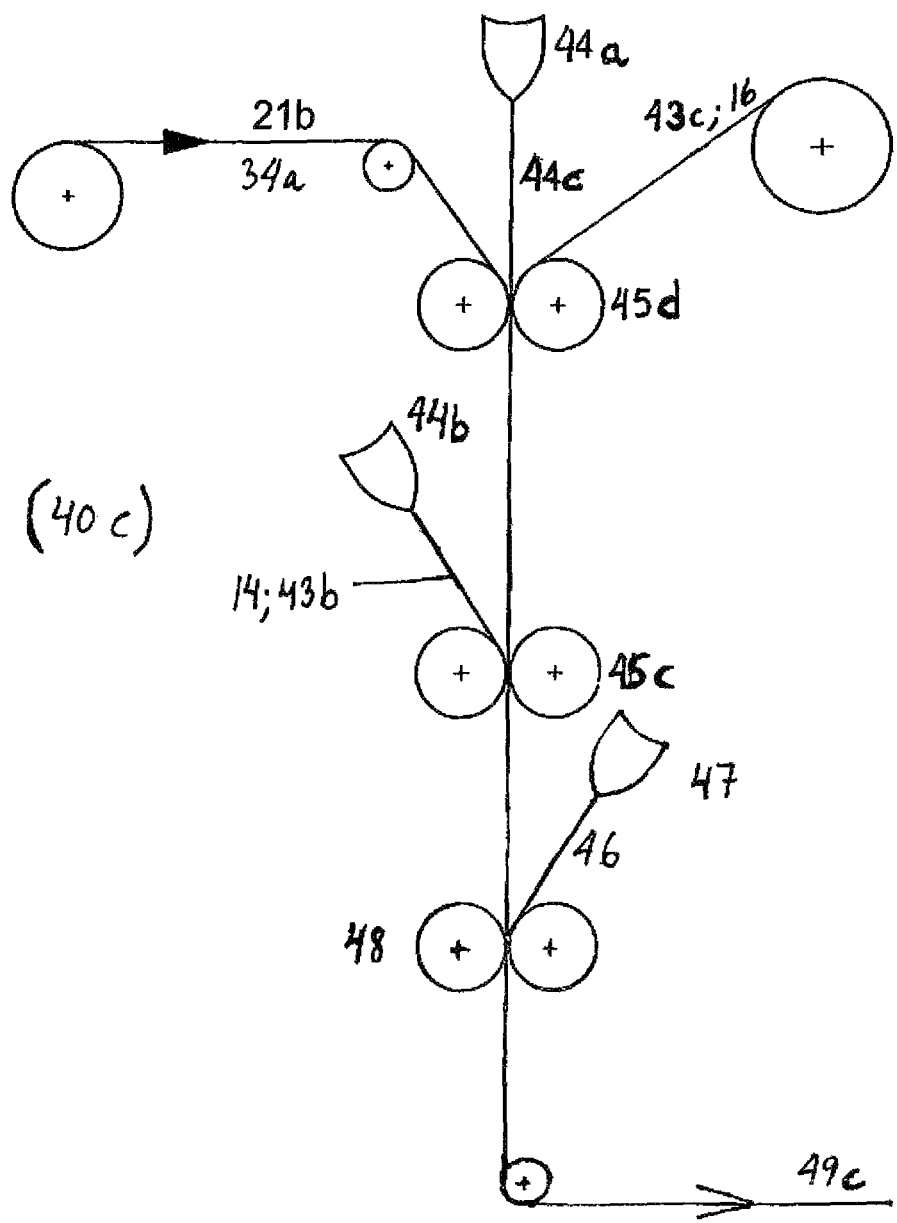
Figure 5A:
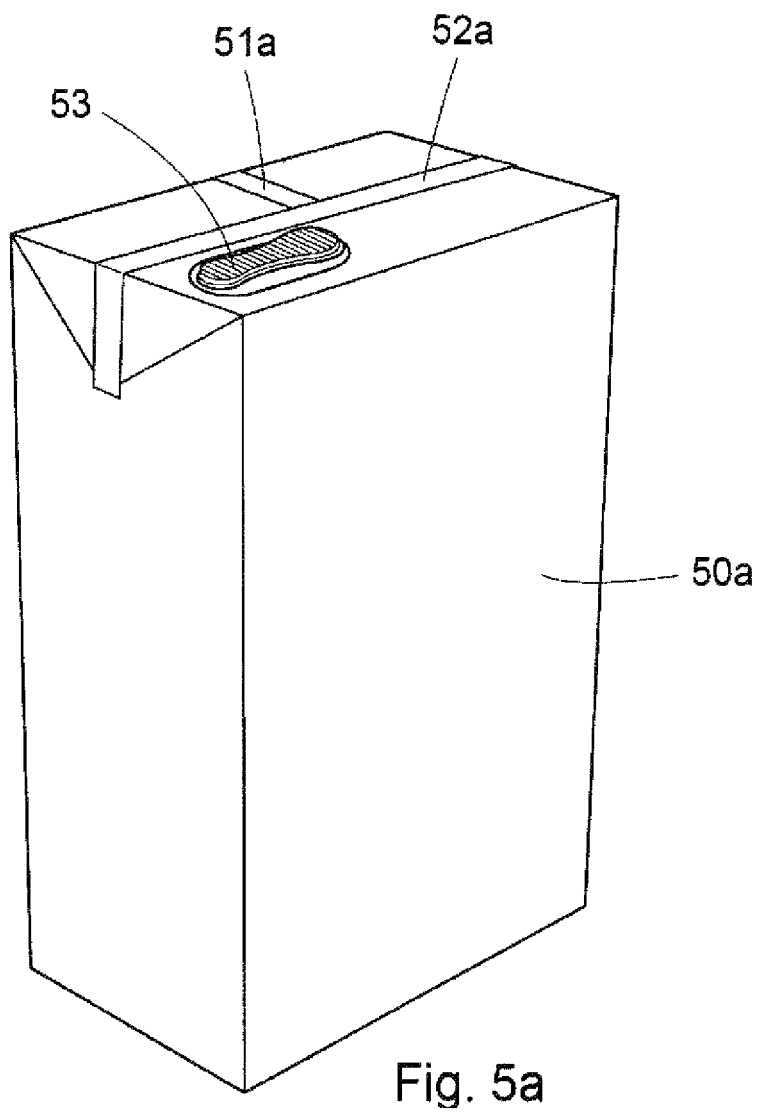
Figure 5B:
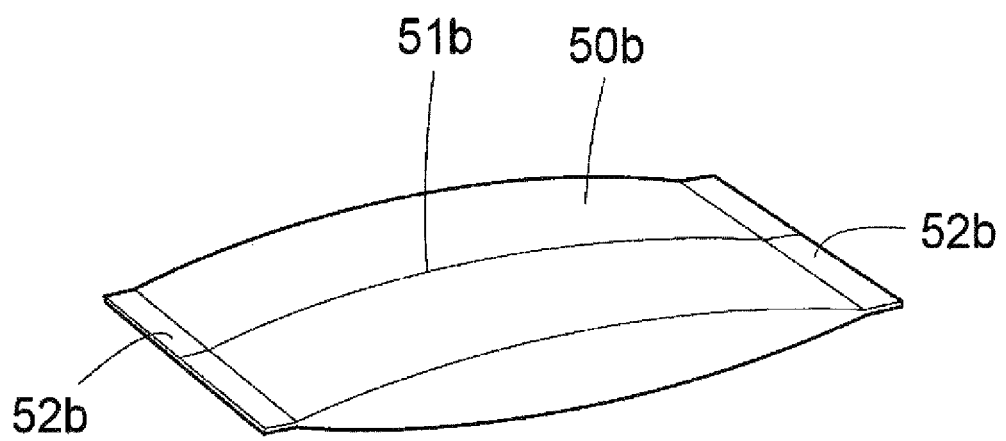
Figure 6:
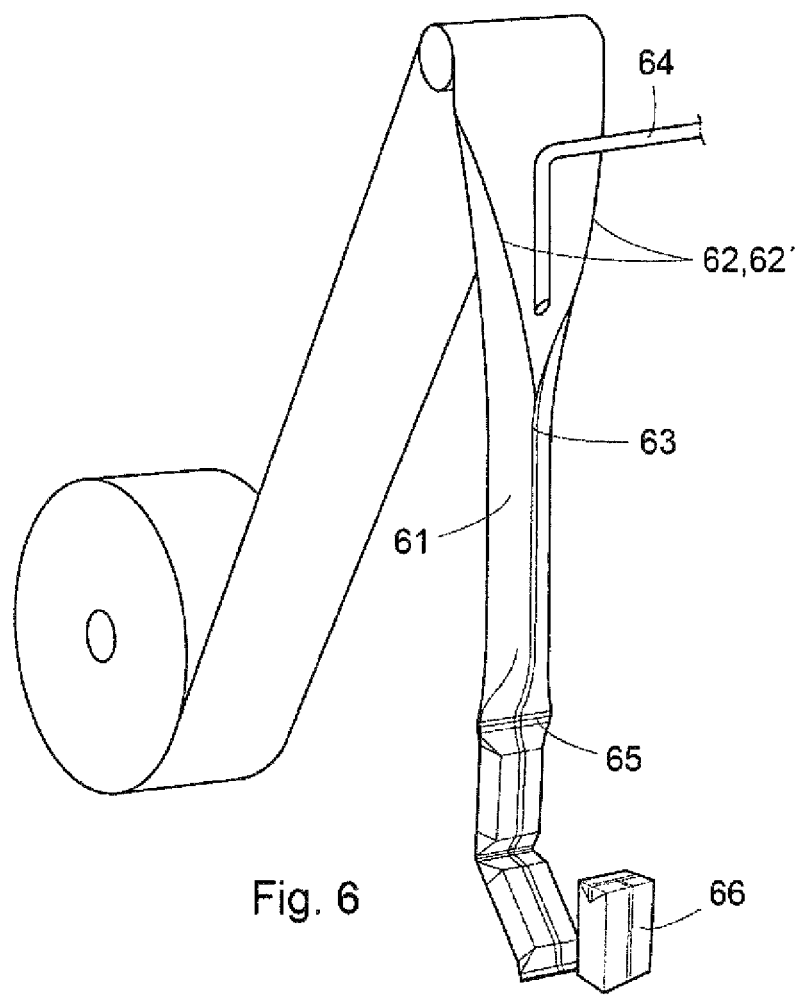

In the following, preferred embodiments of the invention will be described with reference to the drawings, of which:

FIGS. 1a, 1b, 1c and 1d are schematically showing, in cross-section, first, second, third and fourth embodiments of a packaging laminate produced according to the invention, FIG. 2 is grammatically showing a method of liquid film coating of a polymer composition onto a paper substrate layer, FIG. 3 is showing a diagrammatic view of a plant for vapour deposition of a preferred metal layer onto a substrate, FIGS. 4a, 4b and 4c are schematically showing example methods of manufacturing the packaging laminates described in FIG. 1, FIGS. 5a and 5b are showing examples of packaging containers produced from the packaging laminate according to the invention, and FIG. 6 is showing the principle of how such packaging containers are manufactured from the packaging laminate in a continuous form, fill and seal process.

EXAMPLES AND DETAILED DESCRIPTION

Example 1

Preparation of an aqueous coating composition for the induction heat sealing durable layer: An aqueous dispersion of exfoliated laminar montmorillonite particles (Kunipia F from Kunimine Kogyo Co.) having an aspect ratio of about 50-5000, is blended with an aqueous solution of about 30 weight-% of PVOH (Mowiol 15-99, having a saponification degree of above 99%) at 60-90° C. during 1-8 hours. The dispersion of exfoliated laminar mineral particles may be stabilised by means of a stabiliser additive. Alternatively, the laminar mineral particles are exfoliated directly in the PVOH-solution at 60-90° C. during 1-8 hours.

An aqueous composition of aqueous dissolved and dispersed PVOH and 30 weight-% exfoliated bentonite clay, was thus coated by means of liquid film coating, in two consecutive steps with drying in between, onto a thin paper web having a surface weight of 50 g/m2, with 3 g/m2 PVOH coating in total. The wet applied coating is dried by hot air to evaporate the water.

In a subsequent step, the PVOH-coated paper was coated with an aluminium metal coating by means of a vapour deposition process up to optical density 3, onto the PVOH layer.

The thus metallised, PVOH-coated paper was laminated to a thick paperboard of 260 mN (about 270 g/m2) by means of an extrusion laminating thermoplastic bonding layer of low density polyethylene (LDPE), and the thus laminated paper sandwich was subsequently coated with thermoplastic heat sealable layers (LDPE) on both sides and tested for heat seal quality in a Tetra Brik Aseptic® conventional filling machine, employing adapted induction heat sealing of the packaging containers produced. It has for example been seen that to reach sufficient heating efficiency by a very thin metallised layer, the frequency used in the induction sealing process needs to be increased significantly.

The appearance and characteristics of the seals of the thus filled and sealed packaging containers were studied, by tearing the seals apart again. The appearance was noted and compared between the samples. The seal width and evenness in alignment was determined and compared by a further test, in which all packaging material is dissolved around the seal, except for the heat sealed thermoplastics. Finally, the package integrity of a filled and sealed packaging container was tested by using the red ink test. These are all tests well known by dairies and filling sites for Tetra Brik Aseptic® packages, for sealing quality control of the daily produced, filled packaging containers.

The weighed properties and qualities of the samples of sealed packaging containers were evaluated based on many years experience from quality control of conventional packaging laminates for Tetra Brik® Aseptic packaging containers.

The heat seal quality and the integrity of the produced packages was very good, and on par with the seal quality of today's Tetra Brik Aseptic, aluminium foil based packages, according to evaluations by the test panel. In the red ink test, all 300 out of 300 filled and sealed packages, were liquid tight, without leakage points.

Example 2

An aqueous composition of aqueous dissolved and dispersed PVOH, having a saponification degree of above 99%, and 10 weight-% exfoliated bentonite clay, was prepared in a similar way to Example 1 and coated by means of liquid film coating, in two consecutive steps with drying in between, onto a thin paper web having a surface weight of 50 g/m2, with 3 g/m2 PVOH coating in total. The wet applied coating is dried by hot air to evaporate the water.

In a subsequent step, the PVOH-coated paper was coated with an aluminium metal coating by means of a vapour deposition process up to optical density 3, onto the PVOH layer.

The thus metallised, PVOH-coated paper was laminated to a thin paper of 50 g/m2 by means of an extrusion laminating thermoplastic bonding layer of low density polyethylene (LDPE), and the thus laminated paper sandwich was subsequently coated with thermoplastic heat sealable layers (LDPE) on both sides and tested for heat seal quality in a Tetra Brik Aseptic® conventional filling machine, employing adapted induction heat sealing of the packaging containers produced.

Alternatively, it would be technically possible to metallise a thicker paper layer, e.g. of about 100 g/m2, and not laminating it to any further paper layers but keeping it as a single paper layer laminate, coated with outer heat sealable thermoplastic layers. Presently, however, it would not be cost efficient to vapour deposition coat a metallised layer onto such a thick paper substrate, why the above sandwich laminate was made in order to provide a laminate with a corresponding required thickness and stiffness.

The heat seal quality and the integrity of the produced packages was equally very good, according to the same evaluation by the same test panel. Out of 300 tested packages, none had any leakage point relating to the quality of the seals.

Comparative Example 1

A 12 um substrate film of an oriented PET (polyethylene terephthalate), was coated with an aluminium metal coating by means of a vapour deposition process to an optical density of about 3.

The thus metallised, PET-film was laminated to a thick paperboard of about 260 mN (or about 270 g/m2) by means of an extrusion laminating thermoplastic bonding layer of low density polyethylene (LDPE), and subsequently coated with thermoplastic heat sealable layers (LDPE) on both sides and tested for heat seal quality in a Tetra Brik Aseptic® conventional filling machine, employing adapted induction heat sealing of the packaging containers produced.

The heat seal quality and the integrity of the produced packages was acceptable according to evaluation by a test panel of tearing properties of the seals and of the package integrity using the red ink test, in comparison to the above examples. However, the sealing results from test run to test run were not as consistent and reliable as for laminated material with thin paper substrates.

Comparative Example 2

A thin paper web having a surface weight of 50 g/m2 was co-extrusion coated by a first layer of LDPE at 10 g/m2 and a second layer of EAA (ethylene acrylic acid copolymer) at 5 g/m2.

In a subsequent step, the extrusion-coated paper was further coated with an aluminium metal coating by means of a vapour deposition process, onto the EAA layer.

The thus metallised, LDPE/EAA-coated paper was laminated with thermoplastic heat sealable layers on both sides and tested for heat seal quality in a test rig, simulating the real conditions in a conventional filling machine of the Tetra Brik Aseptic® type, employing adapted induction heat sealing of the packaging containers produced. Furthermore, the laminated paper was tested in the conventional filling machine of the Tetra Brik Aseptic® type, employing adapted induction heat sealing of the packaging containers produced.

The weighed properties and qualities of the samples of sealed packaging material and containers were evaluated based on many years experience from quality control of conventional packaging laminates for Tetra Brik® Aseptic packaging containers, and it was seen that no properly sealed packages could be formed in the TBA filling machine, why any further testing of package integrity was unnecessary. Moreover, the results from the tear evaluation from sealing samples from the test rig showed that the seals were not good enough.

Thus, the heat seal quality and the integrity of the produced packages was not good, and not at all on par with the seal quality of today's Tetra Brik Aseptic, aluminium foil based packages, according to evaluations by the same test panel.

Example 3

Thin paper webs of different surface weights were coated by means of liquid film coating in two consecutive steps, with drying in between, with an aqueous composition of aqueous dissolved and dispersed PVOH, having a saponification degree of above 99%, and 10 weight-% exfoliated bentonite clay, as set out in Table 1. The wet applied coatings were dried by hot air to evaporate the water.

In a subsequent step, the PVOH-coated paper webs were coated with an aluminium metal coating by means of a vapour deposition process, onto the PVOH layer.

The thus metallised, PVOH-coated papers were laminated with thermoplastic heat sealable layers on both sides and tested for heat seal quality in a test rig, simulating the real conditions in a conventional filling machine of the Tetra Brik Aseptic® type, employing adapted induction heat sealing of the packaging containers produced.

The results are shown in Table 1, as a ranking list of the various tested samples of thin-paper based packaging materials. The evaluation was made by a test panel for evaluation of seal quality. From the results it can be seen that a thicker paper provides for better sealing results, than a thinner paper. It can also be seen that metal vapour deposition coating of a higher optical density (OD) provides for a somewhat better sealing result than a metal vapour deposition coating of a lower OD. Furthermore, it can be seen that thicker layers of PVOH provides for somewhat better sealing results than thinner layers. All the samples from Table 1, provided very good seal quality in the rig tests, and should provide equally good results of package integrity in filling machine tests, similarly to what was shown in Example 1. Although, better sealing results were perceived by the thicker paper substrates of 70 g/m2, the thinner substrates of 50 g/m2 have been been generally used in the tests, because the thicker ones become much more expensive.

TABLE 1

| Sample No | Paper g/m2 | PVOH g/m2 | OD | Ranking |
|---|---|---|---|---|
| 1 | 50 | 2 × 0.7 | 3 | 6 |
| 2 | 50 | 2 × 1.5 | 1.5 | 5 |
| 3 | 50 | 2 × 1.5 | 3 | 4 |
| 4 | 70 | 2 × 1.5 | 3 | 1 |
| 5 | 70 | 2 × 0.7 | 1.5 | 3 |
| 6 | 70 | 2 × 0.7 | 3 | 2 |

There are of course still possibilities to further increase the gas barrier properties a little by coating thicker or further layers of the PVOH composition, or to fill the PVOH layer with higher amount of inorganic particles. There is, however, a more significant gain in odour barrier properties, by coating a thicker and more densely filled gas barrier layer composition. An excellent example of such a barrier composition comprises PVOH and from 10 to 50, preferably from 20 to 40 weight-% of talcum particles.

In FIG. 1a, there is shown, in cross-section, a first embodiment of a packaging laminate 10a for aseptic packaging and long-term storage under ambient conditions, produced according to the invention. The laminate comprises a first paper layer 11, having a surface weight of 50 g/m2, The paper is prepared to receive a metal vapour deposition coating 12, which can work as an induction heat susceptible material and transmit heat to effect heat sealing in the innermost heat sealable layer 14.

The thin paper, subsequently to be metal vapour-deposition coated, may be prepared by means of coating or by means of impregnating the paper layer or by means of mixing chemicals into the paper pulp at the stage of manufacturing of the paper web, or by any combination of these means or other means, for preparation.

The prepared thin paper web is subsequently vapour deposition metallised to an optical density (OD) of about 3.

An outer liquid tight and heat sealable layer 15 of polyolefin is applied on the outside of the core layer 11, which side is to be directed towards the outside of a packaging container produced from the packaging laminate. The polyolefin of the outer layer 15 may be a conventional low density polyethylene (LDPE) of a heat sealable quality. An innermost liquid tight and heat sealable layer 14 is arranged on the inside of the vapour deposited layer 12, which is to be directed towards the inside of a packaging container produced from the packaging laminate, and the layer 14 will be in contact with the packaged product. The innermost heat sealable layer comprises a polymer based on low density polyethylene, preferably including also an LLDPE produced by polymerising an ethylene monomer with a C4-C8, more preferably a C6-C8, alpha-olefin alkylene monomer in the presence of a metallocene catalyst, i.e. a so called metallocene-LLDPE (m-LLDPE). The innermost heat sealable layer 14 may consist of two or several part-layers of the same or different kinds of polymers and may alternatively constitute a polymer film 14.

According to a preferred embodiment of the invention, the innermost heat sealable layer 14 is bonded to the metal vapour deposition layer by means of a tie layer, preferably of an ethylene acrylic acid copolymer. Alternatively, other tie layers may be used. Alternative examples of polyolefins suitable as tie layers, for bonding the heat sealable innermost layer to the metal-coated paper layer, are modified polyolefins based on LDPE or LLDPE co-polymers or, preferably, graft co-polymers with functional-group containing monomer units, such as carboxylic or glycidyl functional groups, e.g. (meth)acrylic acid monomers or maleic anhydride (MAH) monomers, (i.e. ethylene acrylic acid copolymer (EAA) or ethylene methacrylic acid copolymer (EMAA)), ethylene-glycidyl(meth)acrylate copolymer (EG(M)A) or MAH-grafted polyethylene (MAH-g-PE). Another example of such modified polymers or adhesive polymers are so called ionomers or ionomer polymers. Preferably, the modified polyolefin is an ethylene acrylic acid copolymer (EAA) or an ethylene methacrylic acid copolymer (EMAA).

In special cases, where a thicker heat sealable layer is needed, it is of course possible, although not preferred from a cost perspective, to apply a further heat sealable polyethylene layer onto the inside of the innermost layer 14.

In FIG. 1b, there is shown, in cross-section, a second embodiment of a packaging laminate 10b for aseptic packaging and long-term storage under ambient conditions, produced according to the invention. The laminate comprises a first paper layer 11, having a surface weight of 50 g/m2, and a thin induction sealing durable layer 13 formed by liquid film coating of a liquid polymer composition, and subsequent drying, onto the paper layer 11. The composition comprises an aqueous solution of PVOH and 10 weight-% bentonite, and after drying, the coated layer thus comprises PVOH and exfoliated bentonite particles homogeneously distributed in a laminar fashion within the PVOH layer. Preferably, the PVOH has a saponification degree of at least 99%.

The coated thin paper web is subsequently vapour deposition metallised on its coated side to an optical density (OD) of about 3. The resulting packaging laminate thus comprises a thin paper substrate 11, first coated with PVOH with bentonite and then a thin vapour deposition coating layer 12 of aluminium metal at a thickness of about 50 nm.

An outer liquid tight and heat sealable layer 15 of polyolefin is applied on the outside of the core layer 11, which side is to be directed towards the outside of a packaging container produced from the packaging laminate. The polyolefin of the outer layer 15 may be a conventional low density polyethylene (LDPE) of a heat sealable quality. An innermost liquid tight and heat sealable layer 14 is arranged on the inside of the vapour deposited layer 12, which is to be directed towards the inside of a packaging container produced from the packaging laminate, and the layer 14 will be in contact with the packaged product. The innermost heat sealable layer comprises low density polyethylene, preferably including an LLDPE produced by polymerising an ethylene monomer with a C4-C8, more preferably a C6-C8, alpha-olefin alkylene monomer in the presence of a metallocene catalyst, i.e. a so called metallocene-LLDPE (m-LLDPE). The innermost heat sealable layer 14 may consist of two or several part-layers of the same or different kinds of polymer and may alternatively constitute a polymer film 14.

In special cases, where a thicker heat sealable layer is needed, it is of course possible, although not preferred from a cost perspective, to apply a further heat sealable polyethylene layer onto the inside of the innermost layer 14.

In FIG. 1c, there is shown, in cross-section, a third embodiment of a packaging laminate 10c for aseptic packaging and long-term storage under ambient conditions, produced according to the invention. The laminate comprises a first paper layer 11, having a surface weight of 50 g/m2, and a thin induction sealing durable layer 13 formed by liquid film coating of a liquid polymer composition, and subsequent drying, onto the paper layer 11. The composition comprises an aqueous solution of PVOH and 30 weight-% bentonite particles, and after drying, the coated layer thus comprises PVOH and exfoliated bentonite particles homogeneously distributed in a laminar fashion within the PVOH layer. Preferably, the PVOH has a saponification degree of at least 99%.

The prepared thin paper web is subsequently vapour deposition metallised to an optical density (OD) of about 3.

The packaging laminate thus comprises a thin paper substrate 11, first coated with PVOH and then coated with a thin vapour deposition coating layer 12 of aluminium metal at a thickness of about 50 nm.

In addition, the packaging laminate comprises a second core, paperboard layer 16 having a surface weight of at least 200 g/m2 or, preferably of about 300 g/m2. The first and second paper layers are suitably bonded to each other by means of an intermediate layer 17 of a polyolefin-based polymer, preferably a low density polyethylene (LDPE). The intermediate bonding layer 16 is preferably formed by means of extrusion laminating the metal-coated first paper layer and the second paperboard layer to each other.

The outer liquid tight and heat sealable layers 14 and 15 are defined as in FIGS. 1a and 1b.

In FIG. 1d, there is shown, in cross-section, a fourth embodiment of a packaging laminate 10d, which is similar to the packaging laminate of FIG. 1c, however with an additional layer from liquid film coated PVOH composition with bentonite, 18, on the other, outer side of the first paper layer 11, and, or alternatively, with an additional layer from liquid film coated PVOH composition with bentonite, 19, on the inner side of the second paperboard layer 16. The layer(s) 18, 19 of PVOH provide further gas barrier properties to the packaging laminate.

In order to reduce the amount of moisture released from the paper layer into the vacuum chamber during the metallisation process, the first paper layer, which is to be metal vapour deposition coated, may be coated also on the other, outer side by a liquid film composition of a polymer in aqueous or solvent based dispersion or solution, before the metallisation process step. It is desirable to avoid moisture in the vacuum chamber for metallisation, because it may reduce the speed at which the metallisation process can be carried out. Furthermore, any back transfer of paper dust in the subsequent handling of coated paper webs on reels may be prevented.

According to FIG. 1a and FIG. 1b, the first paper layer 11 may be a thin paper layer of about 50 g/m2 or even less. Since the paper layer is very thin, it may need an additional light barrier by added pigments in one or more of the layers of the laminate. There may, for example, be light reflecting white pigments, such as for example titanium dioxide (TiO2), and/or light absorbing pigments, such as for example carbon black, added to the liquid film coated induction heat sealing durable layer 13. Such pigments are advantageously hidden towards the inside by the metal vapour deposition coating 12, and at least to some extent by the paper layer 11, towards the outside.

In FIG. 2, the method of liquid film coating of a polymer composition onto a paper or paperboard layer is grammatically shown. The paper layer 21a is fed from a storage reel towards a liquid film coating station 22a, where the liquid polymer composition is applied at an amount such that the amount of coated and dried layer is about 1-3 g/m2, when the coated paper has passed the drying station 22b. Preferably, the liquid film coating operation is carried out in two steps, i.e. by first coating 0.5-1.5 g/m2, drying in an intermediate step and then coating a second time at 0.5-1.5 glm2 and finally drying the total liquid film coated layer to obtain a coated paper layer 21b.

FIG. 3 is a diagrammatic view of an example of a plant for vapour deposition coating of a metal layer 12 onto the coated thin first paper layer produced in FIG. 2. The thin paper web 21b from FIG. 2 is subjected, on the coating receiving side, to continuous evaporation deposition 30, of a metallised layer of aluminium, possibly in a mixture with aluminium oxide, and the coating is given a thickness of 5-100 nm, preferably 5-50 nm, so that the metal coated paper of the invention 34a is formed. The aluminium vapour comes from a solid piece evaporation source 31.

In FIG. 4a, the coating process 40a is shown, wherein the induction heat sealing durable and/or oxygen barrier coated paper layer 21b, further coated with a thin metal vapour deposited coating 34a, is extrusion laminated to an inside polymer film 43, having an adhesive layer 43a on the side facing towards the paper layer, by extruding an intermediate bonding layer of LDPE 44 from an extrusion station 44a and pressing together in a roller nip 45. Subsequently, the laminated paper and film passes a second extruder 47 and lamination nip 48, where an outermost heat sealable layer of LDPE 46 is coated onto the outer side of the paper layer. Finally, the finished packaging laminate 49a is wound onto a storage reel, not shown.

In FIG. 4b, an alternative embodiment is shown, wherein the metal coated paper layer 34a is directly extrusion coated with the innermost polymer layer(s) 14; 43b, in a first extrusion coating station 44b, and pressed together in a roller nip 45b, similar to the extruder 47 and lamination nip 48. Finally, the finished packaging laminate 49b is wound onto a storage reel, not shown.

When the packaging laminate comprises an additional, second paperboard layer 16, as shown in FIG. 1c, there is a further lamination step in which the metal coated paper is extrusion laminated to the paperboard layer 43c; 16. The outermost and innermost heat sealable polymer layers of low density polyethylene(s) may be subsequently coated, in any order, by means of extrusion coating as in FIG. 4b above, or alternatively, by means of extrusion laminating an innermost heat sealable film, as shown in FIG. 4a above.

FIG. 5a shows one example of a packaging container 50 produced from the packaging laminate 10c according to the invention. The packaging container is particularly suitable for beverages, sauces, soups or the like. Typically, such a package has a volume of about 100 to 1000 ml. It may be of any configuration, but is preferably brick-shaped, having longitudinal and transversal seals 51 and 52, respectively, and optionally an opening device 53. In another embodiment, not shown, the packaging container may be shaped as a wedge. In order to obtain such a "wedge-shape", only the bottom part of the package is fold formed such that the transversal heat seal of the bottom is hidden under the triangular corner flaps, which are folded and sealed against the bottom of the package. The top section transversal seal is left unfolded. In this way the half-folded packaging container is still is easy to handle and dimensionally stable when put on a shelf in the food store or on a table or the like.

FIG. 5b shows an alternative, example of a packaging container 50b produced from the packaging laminate 10b according to the invention. Since the packaging laminate 10b is thinner by having a thinner paper core layer, it is not dimensionally stable enough to form a parallellepipedic or wedge-shaped packaging container, and is not fold formed after transversal sealing 52b. It will thus remain a pillow-shaped pouch-like container and distributed and sold like this.

FIG. 6 shows the principle as described in the introduction of the present application, i.e. a web of packaging material is formed into a tube 61 by the longitudinal edges 62, 62' of the web being united to one another in an overlap longitudinal joint 63. The tube is filled 64 with the intended liquid food product and is divided into individual packages by repeated transversal seals 65 of the tube at a pre-determined distance from one another below the level of the filled contents in the tube. The packages 66 are separated by incisions in the transversal seals and are given the desired geometric configuration by fold formation along prepared crease lines in the material.

The invention is not limited by the embodiments shown and described above, but may be varied within the scope of the claims.

The invention claimed is:

1. A non-foil packaging laminate for induction heat sealing into packages for liquid food or beverage, the non-foil packaging laminate comprising at least one, first layer of paper or other cellulose-based material, which first layer of paper or other cellulose-based material possesses an inner side and is pre-coated with an induction sealing durable coating layer so that the induction sealing durable coating layer is in direct contact with the inner side of the first layer of paper or other cellulose-based material to form a pre-coated first paper layer, an induction heat susceptible metal layer, the induction heat susceptible metal layer being deposited by vapour deposition directly on the pre-coated first paper layer so that the induction heat susceptible metal layer is directly deposited on the induction sealing durable coating layer, and at least one layer of liquid-tight, heat sealable thermoplastic polymer material applied onto an inner side of the induction heat susceptible metal layer, the induction heat susceptible metal layer causing heating and melting of the heat sealable thermoplastic polymer material to induce heat sealing in the heat sealable thermoplastic polymer material when the induction heat susceptible metal layer is subjected to a magnetic field during a heat sealing operation, the induction sealing durable coating layer providing a receiving surface for the induction heat susceptible metal layer and supporting the induction heat susceptible metal layer during the heat sealing operation, the induction sealing durable coating layer being formed from a composition mainly comprising a polymer selected from the group consisting of PVOH, water dispersible EVOH or starch, and the liquid-tight, heat sealable thermoplastic polymer material being polyethylene.

2. The non-foil packaging laminate according to claim 1, wherein the at least one layer of liquid-tight, heat sealable thermoplastic polymer material includes an innermost layer of the liquid-tight, heat sealable thermoplastic material, and the induction sealing durable coating layer possesses a higher melting point than the innermost layer of the liquid-tight, heat sealable thermoplastic material.

3. The non-foil packaging laminate according to claim 2, wherein the induction sealing durable coating layer is formed by liquid film coating of a liquid composition onto said first paper layer and subsequent drying, the liquid composition containing a polymer binder dispersed or dissolved in an aqueous or solvent medium.

4. The non-foil packaging laminate according to claim 3, wherein said liquid composition further comprises inorganic particles.

5. The non-foil packaging laminate according to claim 4, wherein said liquid composition comprises about 1 to about 40 wt % inorganic particles based on dry weight, wherein said inorganic particles comprise laminar compounds with an aspect ratio of 50 to 5000.

6. The non-foil packaging laminate according to claim 3, wherein said liquid composition further comprises about 20 to about 50 wt % based on dry weight of inorganic particles comprising laminar talcum particles having an aspect ratio from 10 to 500.

7. The non-foil packaging laminate according to claim 2, wherein said induction sealing durable coating layer is applied at a total amount of from 0.5 to 7 $g/m^2$, dry weight.

8. The non-foil packaging laminate according to claim 2, wherein the induction sealing durable coating layer is applied at a total amount of from 0.5 to 3 $g/m^2$, dry weight.

9. The non-foil packaging laminate according to claim 2, wherein the induction sealing durable coating layer is formed by liquid film coating of a first liquid composition onto said first paper layer and subsequent drying to form a first induction sealing durable coating part-layer, liquid film coating of a second liquid composition onto said first induction sealing durable coating part-layer and subsequent drying, the first and second liquid compositions containing a polymer binder dispersed or dissolved in an aqueous or solvent medium, wherein the first induction sealing durable coating part-layer is applied at a total amount of 0.3 to 3.5 $g/m^2$, and wherein the second induction sealing durable coating part-layer is applied at a total amount of 0.3 to 3.5 g/m2.

10. The non-foil packaging laminate according to claim 9, wherein at least one of the induction sealing durable coating part-layers is applied at a total amount of 0.5 to 2 $g/m^2$.

11. The non-foil packaging laminate according to claim 1, wherein the induction heat susceptible metal layer is a layer substantially consisting of aluminium.

12. The non-foil packaging laminate according to claim 1, wherein the induction heat susceptible metal layer has an optical density of from 1 to 5.

13. The non-foil packaging laminate according to claim 1, wherein the first layer of paper or other cellulose-based material is an innermost situated layer of paper or other cellulose-based material and has a surface weight of from 20 to 100 $g/m^2$.

14. The non-foil packaging laminate according to claim 1, wherein the induction heat susceptible metal layer has an optical density of from 2 to 3.

15. The non-foil packaging laminate according to claim 1, wherein the induction sealing durable coating layer is formed from a composition comprising PVOH and inorganic particles.

16. A non-foil packaging laminate for induction heat sealing into packages for liquid food or beverage, the non-foil packaging laminate comprising at least one, first, layer of paper or other cellulose-based material, which first paper layer possesses an inner side and is pre-coated with an induction sealing durable coating layer so that the induction sealing durable coating layer is in direct contact with the inner side of the first layer of paper or other cellulose-based material to form a pre-coated first paper layer, an induction heat susceptible metal layer, the induction heat susceptible metal layer being deposited by vapour deposition directly on the pre-coated first paper layer so that the induction heat susceptible metal layer is directly deposited on the induction sealing durable coating layer, at least one layer of liquid-tight, heat sealable thermoplastic polymer material applied onto an inner side of the induction heat susceptible metal layer, the induction heat susceptible metal layer causing heating and melting of the heat sealable thermoplastic polymer material to induce heat sealing in the heat sealable thermoplastic polymer material when the induction heat susceptible metal layer is subjected to a magnetic field during a heat sealing operation, and a second layer of paper or carton laminated to the outside of the first layer of paper or other cellulose-based material, which second paper layer has a surface weight of from 50 to 500 g/m², the induction sealing durable coating layer providing a receiving surface for the induction heat susceptible metal layer and supporting the induction heat susceptible metal layer during the heat sealing operation, the induction sealing durable coating layer being formed from a composition mainly comprising a polymer selected from the group consisting of polyvinyl alcohol, water dispersible ethylene vinyl alcohol, polyvinylidenechloride, water dispersible polyimide, polysaccharide, polysaccharide derivatives, starch, starch derivatives and combinations of two or more thereof, and the liquid-tight, heat sealable thermoplastic polymer material being polyethylene.

17. The non-foil packaging laminate according to claim 16, comprising an intermediate polymer layer between the first layer of paper or other cellulose-based material and the second layer of paper or other cellulose-based material to laminate the second layer of paper or other cellulose-based material to the first layer of paper or other cellulose-based material.

18. The non-foil packaging laminate according to claim 16, wherein the second layer of paper or other cellulose-based material is laminated to the outside of the first layer or other cellulose-based material after the first layer of paper or other cellulose-based material is pre-coated with the induction sealing durable coating layer.

19. A packaging laminate for induction heat sealing into packages for liquid food or beverage, the packaging laminate comprising at least one, first, layer of paper or other cellulose-based material, an induction sealing durable coating layer in direct contact with an inner side of the first layer of paper or other cellulose-based material, an induction heat susceptible metal layer deposited by vapour deposition on an inner side of said induction sealing durable coating layer, and at least one layer of liquid-tight, heat sealable thermoplastic polymer material applied onto an inner side of the induction heat susceptible metal layer, the at least one layer of liquid-tight, heat sealable thermoplastic polymer material including an innermost layer of the liquid-tight, heat sealable thermoplastic material, the induction heat susceptible metal layer causing heating and melting of the heat sealable thermoplastic polymer material to induce heat sealing in the heat sealable thermoplastic polymer material when the induction heat susceptible metal layer is subjected to a magnetic field during a heat sealing operation, the induction sealing durable coating layer providing a receiving surface for the induction heat susceptible metal layer and supporting the induction heat susceptible metal layer during the heat sealing operation, the induction sealing durable coating layer possessing a higher melting point than the innermost layer of the liquid-tight, heat sealable thermoplastic material, and the liquid-tight, heat sealable thermoplastic polymer material being polyethylene.

20. The packaging laminate of claim 19, wherein the induction heat susceptible metal layer has an optical density of from 1 to 5.

21. The packaging laminate of claim 19, wherein the first layer of paper or other cellulose-based material is an innermost situated layer of paper or other cellulose-based material and has a surface weight of from 20 to 100 g/m².

22. The packaging laminate of claim 19, wherein the induction heat susceptible metal layer has a thickness of from 5 to 100 nm.

23. The packaging laminate of claim 19, wherein the induction heat susceptible metal layer has a thickness of from 5 to 50 nm.

24. The packaging laminate of claim 23, wherein the induction heat susceptible metal layer is a layer substantially consisting of aluminium.

\* \* \* \* \*